United States Patent
Akif et al.

(10) Patent No.: US 12,179,690 B2
(45) Date of Patent: Dec. 31, 2024

(54) DEFORMATION STRUCTURE AND PEDESTRIAN PROTECTION DEVICE HAVING A DEFORMATION STRUCTURE

(71) Applicant: Bayerische Motoren Werke Aktiengesellschaft, Munich (DE)

(72) Inventors: Oeztzan Akif, Munich (DE); Christian Hack, Schweitenkirchen (DE); Stefan Hiermaier, Freiburg (DE); Arne Koehler, Pliening (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 178 days.

(21) Appl. No.: 17/595,509

(22) PCT Filed: May 15, 2020

(86) PCT No.: PCT/EP2020/063613
§ 371 (c)(1),
(2) Date: Nov. 18, 2021

(87) PCT Pub. No.: WO2020/239473
PCT Pub. Date: Dec. 3, 2020

(65) Prior Publication Data
US 2022/0161754 A1  May 26, 2022

(30) Foreign Application Priority Data
May 29, 2019  (DE) ..................... 10 2019 114 512.0

(51) Int. Cl.
*B60R 19/00*  (2006.01)
*B60R 19/18*  (2006.01)
*B60R 21/34*  (2011.01)

(52) U.S. Cl.
CPC .............. *B60R 21/34* (2013.01); *B60R 19/18* (2013.01); *B60R 2019/007* (2013.01); *B60R 2019/1833* (2013.01); *B60R 2021/343* (2013.01)

(58) Field of Classification Search
CPC .............. B60R 2019/007; B60R 19/18; B60R 2019/1833; B60R 2019/186; B60R 2019/1866; B60R 21/34; B60R 2021/343
See application file for complete search history.

(56) References Cited

U.S. PATENT DOCUMENTS

2006/0125250 A1* 6/2006 Evans ..................... B60R 19/18
293/121
2006/0286342 A1 12/2006 Elzey
(Continued)

FOREIGN PATENT DOCUMENTS

CN  203558028 U  4/2014
CN  105730386 A  7/2016
(Continued)

OTHER PUBLICATIONS

Description Translation for DE 102009055085 from Espacenet (Year: 2009).*
(Continued)

*Primary Examiner* — Jason D Shanske
*Assistant Examiner* — Daniel M. Keck
(74) *Attorney, Agent, or Firm* — Crowell & Moring LLP (57) ABSTRACT

A deformation structure has at least a first layer and a second layer, which are spaced apart from each other and are mounted to be movable relative to each other in the deformation direction or load direction. The first layer and the second layer have complementary protrusions and recesses, which are designed such that the protrusions of the first layer can dip into the recesses of the second layer and vice versa.

(Continued)

The first layer and the second layer are connected to each other by deformable connecting pieces such that, in the event of a high impulse in the deformation direction, the protrusions of the first layer dip into the recesses of the second layer and the protrusions of the second layer dip into the recesses of the first layer such that the deformation structure is deformed in the deformation direction at a relatively low level of force and, in the event of a low impulse in the deformation direction, the protrusions of the first layer hit the protrusions of the second layer such that the deformation structure is deformed further in the deformation direction at a relatively high level of force. The deformation control device is formed or produced separately from the first and the second layer and is removably or non-removably connected to the first layer and the second layer.

21 Claims, 6 Drawing Sheets

(56) References Cited

U.S. PATENT DOCUMENTS

| | | | |
|---|---|---|---|
| 2017/0282823 | A1 | 10/2017 | Akif et al. |
| 2017/0282825 | A1 | 10/2017 | Akif et al. |
| 2019/0016295 | A1 | 1/2019 | Naderer et al. |

FOREIGN PATENT DOCUMENTS

| | | | | |
|---|---|---|---|---|
| CN | 205871964 | U | 1/2017 | |
| CN | 107074176 | A | 8/2017 | |
| CN | 108778845 | A | 11/2018 | |
| CN | 108944757 | A | 12/2018 | |
| DE | 10 2009 055 085 | A1 | 6/2011 | |
| DE | 10 2010 054 641 | A1 | 6/2012 | |
| DE | 10 2012 112 636 | A1 | 7/2014 | |
| DE | 10 2013 000 481 | A1 | 7/2014 | |
| DE | 10 2015 211 976 | A1 | 12/2016 | |
| DE | 10 2016 204 264 | A1 | 9/2017 | |
| GB | 2 384 215 | A | 7/2003 | |
| WO | WO-2015163311 | A1 * | 10/2015 | ............. B29C 51/10 |

OTHER PUBLICATIONS

Description Translation for DE 1020160016295 from Espacenet (Year: 2016).*
Description Translation for DE 102016204264 from Espacenet (Year: 2016).*
Description Translation for WO 2015/163311 from Espacenet (Year: 2015).*
English translation of Chinese Office Action issued in Chinese Application No. 202080038829.4 dated Jun. 5, 2023 with English translation (8 pages).
International Search Report (PCT/ISA/210) issued in PCT Application No. PCT/EP2020/063613 dated Jul. 13, 2020 with English translation (four (4) pages).
German-language Written Opinion (PCT/ISA/237) issued in PCT Application No. PCT/EP2020/063613 dated Jul. 13, 2020 (five (5) pages).
German-language Search Report issued in German Application No. 10 2020 106 938.3 dated Mar. 24, 2020 with partial English translation (13 pages).

* cited by examiner

DEFORMATION STRUCTURE AND PEDESTRIAN PROTECTION DEVICE HAVING A DEFORMATION STRUCTURE

BACKGROUND AND SUMMARY OF THE INVENTION

The present invention relates to a deformation structure, in particular for a motor vehicle, for example a passenger motor vehicle or a heavy goods motor vehicle, and to a pedestrian protection device having a deformation structure which is arranged between a body outer skin element and a body carrier element.

A known front end of a motor vehicle has for example a bumper crossmember, which is fastened to front ends of longitudinal members, and a bumper cladding, wherein a soft foam that can deform at a comparatively low level of load is arranged between the bumper cladding and the bumper crossmember in order to protect pedestrians. On account of pedestrian protection, the soft foam is arranged in order to protect a pedestrian where appropriate against direct and immediate collision with a hard, stiff structure of the motor vehicle, such as for example the bumper crossmember.

Furthermore, it is required for the motor vehicle to remain free from damage in the event of a collision at a very low speed range of up to 4 km/h, for example, in which pedestrian protection is irrelevant because of the low speed. For this purpose, a penetration depth of a collision counterpart should be as low as possible.

In addition, at a somewhat higher speed, which is likewise still not relevant for pedestrian protection, it is required that damage in the event of a collision is as small as possible and that, for example, a radiator structure which is situated in the vehicle front-end region is not damaged. For this purpose, it would be helpful if the structure situated in front of the bumper crossmember can already absorb collision energy to an adequate extent. For this purpose, a penetration depth of a collision counterpart should likewise be as low as possible.

The various requirements are somewhat in conflict with one another and require a comparatively long vehicle overhang at the vehicle front and therefore have a higher weight and a disadvantageous influence on the driving dynamics.

In order to solve the resulting conflict of objectives, a bumper arrangement with a crossmember which is fastened to the vehicle body via crash boxes has been proposed, for example, in DE 102010054641 A1. A pedestrian protection element for a soft impact against a pedestrian is formed in front of the crossmember in the direction of travel. In addition, a pivotable energy absorption element is provided which can pivot in front of the pedestrian protection element and thereby permits increased energy absorption in the event of collisions in which a higher collision energy absorption capability of the crash structure of the motor vehicle is required.

DE 102012112636 A1 likewise discloses a bumper arrangement, comprising a bumper crossmember and a pedestrian protection element which can be switched by means of an actuator from a stiff state into a comparatively soft state which serves for pedestrian protection.

A common feature of the bumper arrangements described in DE 102010054641 A1 and DE 102012112636 A1 is that a crash or pre-crash sensor system is required for this purpose, wherein, on the basis of the output signals of the sensor system, a switch can be made between a hard, stiff state of the crash structure with high collision energy absorption capability and a soft state of the crash structure with low collision energy absorption capability in favor of pedestrian protection.

DE 102016204264 A1 further discloses a deformation structure of the generic type which has at least one first layer and a second layer, which are arranged spaced apart from one another and so as to be displaceable with respect to one another in the deformation direction or load direction. The first layer and the second layer have complementary protrusions and depressions, which are formed in such a way that the protrusions of the first layer and the depressions of the second layer and also the protrusions of the second layer and the depressions of the first layer can enter into one another. The first layer and the second layer are connected to one another via deformable web elements in such a way that, in the case of a high impulse in the deformation direction, the protrusions of the first layer enter into the depressions of the second layer and also the protrusions of the second layer enter into the depressions of the first layer, with the result that a deformation of the deformation structure in the deformation direction takes place at a relatively low level of force, and in such a way that, in the case of a low impulse in the deformation direction, the protrusions of the first layer impinge on the protrusions of the second layer, with the result that further deformation of the deformation structure in the deformation direction takes place at a relatively high level of force.

It is the object of the present invention to provide a deformation structure and a pedestrian protection device having the deformation structure for a motor vehicle, wherein the deformation of the deformation structure takes place more reliably at the relatively high level of force and manufacture of the deformation structure is easier and more cost-effective.

This object is achieved by a deformation structure and by a pedestrian protection device in accordance with the independent claims. Advantageous configurations of the invention are specified in the dependent patent claims.

A deformation structure according to the invention, which may also be referred to as energy absorption structure, has at least one first layer and a second layer, which are arranged spaced apart from one another and so as to be displaceable with respect to one another in the deformation direction or load direction. The first layer and the second layer have complementary protrusions and depressions, which are formed in such a way that the protrusions of the first layer and the depressions of the second layer and also the protrusions of the second layer and the depressions of the first layer can enter into one another. The first layer and the second layer are connected to one another via a deformation control device in such a way that, in the case of a high impulse in the deformation direction, the protrusions of the first layer enter into the depressions of the second layer and also the protrusions of the second layer enter into the depressions of the first layer, with the result that a deformation of the deformation structure in the deformation direction takes place at a relatively low level of force, and in such a way that, in the case of a low impulse in the deformation direction, the protrusions of the first layer impinge on the protrusions of the second layer, with the result that a further deformation of the deformation structure in the deformation direction takes place at a relatively high level of force, or a greater force can be transmitted through the deformation structure. According to the invention, the deformation control device is formed or produced separately from the first and the second layer and is connected detachably or non-detachably to the first layer and to the second layer.

The deformation structure can deform at different levels of energy depending on the load case, i.e. a collision impulse, and thus has different stiffnesses. The "switching" between the two stiffnesses is effected in this case automatically and independently of a sensor system or an actuator. The setting of the stiffnesses is brought about in this respect by a specific, geometrically complementary configuration of the first layer and the second layer and the connection of the layers via a deformation control device. In the case of the low impulse, protrusions of oppositely situated layers impinge on one another. The separate formation of the layers and the deformation control device makes it possible to produce the deformation structure cost-effectively and easily using production methods suitable for large numbers of items. Furthermore, the requirements for the deformation control device, which is intended to control a deformation of the deformation structure, are different to the requirements for the layers, which should be sufficiently stiff and strong, and where appropriate, in particular in the case of the low impulse, should sufficiently transmit forces, with the result that the separate production allows greater degrees of freedom given an appropriate design.

According to a preferred refinement of the present invention, the deformation control device is connected to the first layer and/or the second layer by means of a clip connection.

A clip connection is a form-fitting connection with an elastically resilient, undercut engagement.

This makes it possible to produce the deformation structure easily by plugging together the individual elements.

The deformation control device may also be adhesively bonded to the first layer and/or the second layer.

Furthermore, the deformation control device may be pressed together with the first layer and/or the second layer in a suitable manner by way of an interference fit.

Furthermore, the deformation control device may be in the form of an injection-molded part, in particular of plastic. Injection molding is a particularly favorable production method given large numbers of items.

Advantageously, the deformation control device may have a plurality of elastically deformable control webs. The control webs connect the layers to one another and in particular determine a spacing between the layers in a starting position and kinematics or movement behavior of the layers when load is being introduced in the collision direction depending on the level of a collision impulse.

The elastic formation of the control webs allows the deformation of the deformation structure to be reversible—at least in certain cases.

According to a preferred refinement, at least two deformation control devices are provided. In this respect, the deformation control devices are advantageously arranged at opposite ends or end portions of the first layer and the second layer and are connected to the first layer and the second layer.

This makes it possible to better control a deformation of the deformation structure in the load case.

According to a preferred refinement of the deformation structure, the first layer and the second layer are each formed in particular in one piece as an injection-molded part, in particular of plastic.

This makes it possible to produce the layers cost-effectively in large numbers. The deformation structure may also have a sufficiently lightweight form as a result.

According to another preferred refinement, the first layer and the second layer are each formed, in particular in one piece, by shaping a metal sheet. In particular, the layers are produced by deep drawing or roll forming. The layers may be produced from a steel sheet or a lightweight metal sheet in this case.

This also makes it possible to produce the layers cost-effectively in large numbers. It is also possible to form particularly stiff, stable layers from metal sheets.

According to yet another preferred refinement of the deformation structure, the first layer and the second layer are formed in particular in one piece as an extruded profile, in particular an extruded aluminum profile.

This also makes it possible to produce the layers cost-effectively in relation to the weight and high stiffness for the load case with a low collision impulse.

In the deformation structure according to the invention, the protrusions of the first layer and/or the second layer may have a surface that has been modified by a friction-increasing measure.

The protrusions of the first layer and/or the second layer may have increased roughness and in particular may be corrugated, for example.

In this way, advantageously the layers or the oppositely situated protrusions can be prevented from sliding off one another, or the extent to which this occurs can be reduced, in the load case with a low collision impulse, and the deformation structure can reliably transmit a load up to a certain level.

The protrusion of the first layer and the protrusion of the second layer have a complementary form to one another in such a way that a form fit in the lateral direction, i.e. a direction transverse to the deformation direction, that is to say a direction substantially perpendicular to the deformation direction, between the protrusion of the first layer and the protrusion of the second layer is produced at least in the lateral direction in the case of the low impulse in the deformation direction.

The form fit between the protrusions reduces the probability of the first and the second layer becoming further offset in relation to one another in the lateral direction, that is to say a direction transverse to the deformation direction, i.e. a direction parallel to the extent of the layers, and of the protrusions of the two layers coming out of engagement again and thus possibly the deformation element deforming undesirably at a low level of force. According to the invention, it is accordingly ensured that the adjacent layers are mutually reliably supported on oppositely situated protrusions and the further deformation of the deformation element takes place at the relatively high level of force or a transmission of force at a relatively high level of force is possible. The oppositely situated protrusions, or the protrusions which come into an oppositely situated position in the course of the collision, in other words have complementary geometries, which allow a mutual form fit, acting in particular in the lateral direction, of the oppositely situated protrusions.

According to one refinement of the deformation structure according to the invention, the protrusion of the second layer or the protrusion of the first layer has a depression, which is adapted in such a way that the protrusion of the first layer—or the protrusion of the second layer if the depression is formed in the first layer—can engage into the depression, with the result that a movement of the first layer and the second layer in relation to one another is inhibited, that is to say at least impeded or even prevented, at least in the lateral direction.

The depression allows a form fit between the oppositely situated protrusions in the lateral direction. The protrusion that engages into the depression of the oppositely situated protrusion cannot deflect laterally if a collision force acts in the collision direction of the deformation element, since for this it would have to get around lateral edges of the depression, this in turn being made more difficult by the acting collision force. The protrusion that engages into the depression butts against the corresponding edge of the depression in the event of a lateral movement.

According to a further refinement of the deformation structure according to the invention, the protrusion of the second layer and/or the protrusion of the first layer has/have a step, which is adapted in such a way that the protrusion of the first layer—or the protrusion of the second layer if the step is formed on the first protrusion—can engage with the step such that a movement of the first layer with respect to the second layer is inhibited, that is to say at least impeded or even prevented, at least in the lateral direction.

The mode of operation of the step is similar to the depression, with the step inhibiting a movement of the adjacent layers in only one lateral direction (transverse direction), whereas the above-mentioned depression can also inhibit a movement in a further, in particular the opposite lateral, direction. For this purpose, the step may have a form that is high enough to ensure that the corresponding protrusion comes into engagement with the step of the oppositely situated protrusion in the case of the low-impulse collision.

It is also possible to combine a depression and a step with one another on one protrusion, i.e. to form a protrusion with a depression in addition to a step that is higher than the edge of the depression.

According to one refinement, the first layer and the second layer can also be displaced in a direction parallel to one another by the deformation control device.

In particular, the deformation control device may be formed in such a way that it undergoes brittle and/or plastic failure in the case of the high collision impulse, wherein the deformation control device can reversibly elastically deform in the case of the low impulse. The deformation control device may have control webs, which act in a similar way to hinge kinematics. In this respect, the control webs may bring about a pivoting movement of the first layer and the second layer in relation to one another, in which the first layer and the second layer are displaced parallel to one another and in the deformation direction, that is to say toward one another.

This makes a defined pivoting movement of the first layer and the second layer toward one another possible and allows the stiffness-increasing position of the first layer and the second layer relative to one another to be reliably assumed.

In the case of the high collision impulse, the failure of the control webs prevents the pivoting movement of the first layer and the second layer in relation to one another. By virtue of the failure of the control webs, the first layer and the second layer are displaced toward one another only in the deformation direction substantially without lateral deflection movement.

In the deformation structure according to the invention, the first layer and the second layer are preferably formed or shaped substantially identically.

This facilitates production of the deformation structure. As a result, complementary protrusions and depressions are also possible in a simple manner.

According to a preferred refinement of the deformation structure, the protrusions of the first layer and the depressions of the second layer and also the depressions of the first layer and the protrusions of the second layer are arranged opposite one another in a starting position of the deformation structure.

This makes it possible for the deformation structure to be deformed in the deformation direction at a relatively low level of force in the case of a low collision impulse.

According to a particularly preferred refinement, the first layer and the second layer are in each case in the form of a wavy plate. Here, wave crests and wave troughs form the protrusions and depressions.

The protrusions and depressions (wave crests and wave troughs) may preferably have a trapezoidal shape.

This geometric shape makes it possible for the protrusions and depressions of the oppositely situated layers to be readily displaced into one another.

The deformation structure according to the present invention may have a multiplicity of layers, wherein two adjacent layers in each case form a first layer and a second layer. The deformation structure may have three, four, five, six or more layers, for example.

It is furthermore preferred for one or both outer layer(s), i.e. outer layers or end layers, to have a positionally fixed form.

The deformation structure preferably has an odd number of adjacent layers which are formed in pairs corresponding to the first layer and the second layer.

This makes it possible for the two outermost layers to have a positionally fixed form. In this respect, only the layers arranged in between are displaced in a lateral direction in the case of the low impulse or low introduction of force.

A particularly preferred deformation structure has exactly three layers.

This is the smallest unit in which it is possible for the two outermost layers to have a positionally fixed form. In this case, only the middle layer, which may be for example a second layer, undergoes a parallel displacement with respect to the two outermost layers in the case of the low impulse.

The deformation control device is advantageously configured in such a way that adjacent layers can be displaced in opposite directions in the case of the low collision impulse. What is meant here by "displacement action" is for example a pivoting movement of the layers in opposite directions.

This is intended to achieve a uniform deformation of the deformation structure having the multiplicity of layers in the case of the low collision impulse.

The present invention also relates to a pedestrian protection device for a motor vehicle having a deformation structure according to the invention. In this respect, the deformation structure is preferably arranged between a vehicle outer skin element and a body carrier element.

In this case, the deformation structure is supported on the body carrier element in the event of a collision impulse.

One outer layer may be fastened in a positionally fixed manner to the body carrier element. The other outer layer may be supported likewise in a positionally fixed manner. Here, an odd number of layers, in particular three layers, is preferably provided.

The vehicle outer skin element may be a bumper cladding. The body carrier element may be a bumper crossmember.

The pedestrian protection device according to the invention having the deformation structure means that no collision sensor system and no actuator system is necessary in order, where appropriate, to actively lock or unlock a mechanical mechanism and thus to be able to switch between a structure with a "soft" deformation behavior and one with a "stiff" deformation behavior as required. The pedestrian device according to the invention having the deformation structure acts automatically depending on a collision impulse, which in turn depends on a collision speed of the motor vehicle. The deformation direction is in particular a collision direction and is substantially a vehicle longitudinal direction in the case of the application for pedestrian protection in the motor vehicle front.

Fundamentally, however, the scope of protection of the deformation structure according to the invention also extends to all other areas of use in the motor vehicle sector or else other technology fields in which it is necessary for a deformation structure to be able to deform at different levels of load depending on the load case.

Accordingly, in the case of the low collision impulse and thus the low collision speed of the motor vehicle, the oppositely situated layers pivot in such a way that the protrusions of the oppositely situated layers are situated opposite one another and are supported on one another. The deformation structure accordingly acts in a stiff manner. In the case of the high collision impulse and thus the high collision speed, no pivoting of the oppositely situated layers takes place, with the result that the oppositely situated protrusions and depressions of the oppositely situated layers can be displaced into one another. In this way, the deformation structure reacts more softly over a longer deformation distance.

The pedestrian protection device may be formed, for example, in such a way that the deformation structure reacts more stiffly and is deformed at a higher force in the case of a collision impulse that is generated up to a threshold value speed of the motor vehicle. In this way, in the event of the low collision speed, a collision load can be transmitted to the body element situated behind—at a very low speed—or, for the purpose of protecting components situated behind, the deformation structure absorbs sufficient energy—at a somewhat higher speed which is, however, below the threshold value speed. In any case, this makes it possible to reduce the repair costs, wherein, in particular at a very low speed—for example in the event of what are known as parking knocks, e.g. up to 4 km/h—the repair costs can be limited, if appropriate, to repairing paint damage, for example.

The threshold value speed may be for example 20 km/h or the like.

The pedestrian protection device may also be formed in such a way that the deformation structure reacts more softly and is deformed at a lower force in the case of a collision impulse that is generated from and including the threshold value speed of the motor vehicle. This is particularly advantageous in the event of the frontal collision of a pedestrian with the motor vehicle from the threshold value speed, since in this respect lower collision forces act on the pedestrian.

Refinements of the invention that are specified above may be combined with one another in any desired manner where possible and expedient.

DETAILED DESCRIPTION OF THE DRAWINGS

Exemplary embodiments of the present invention will be described below with reference to FIGS. 1 to 10.

A first exemplary embodiment of the invention will be explained with reference to FIGS. 1 to 4.

Figure 1:
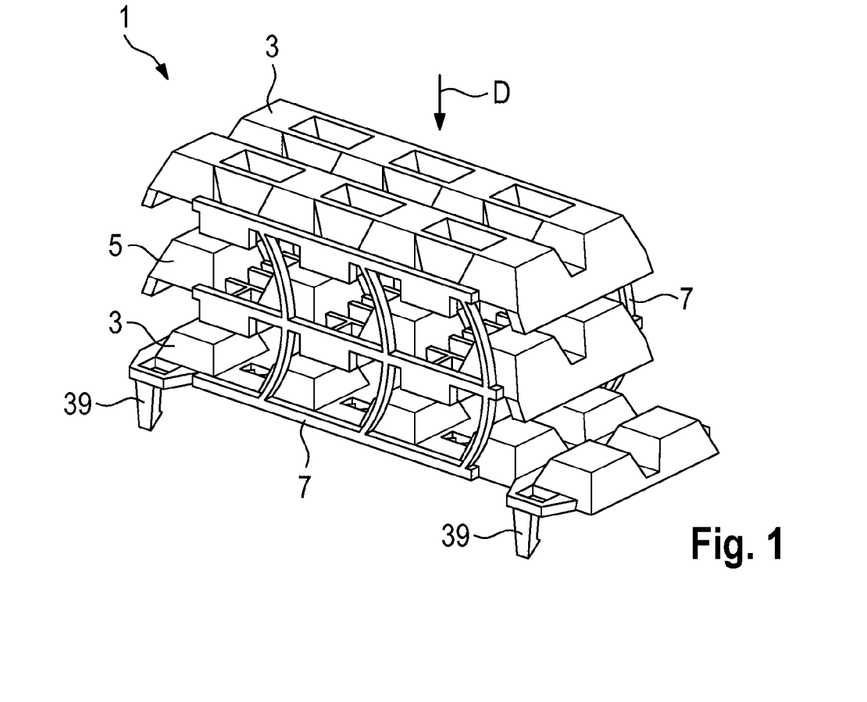
FIG. 1 schematically shows a perspective view of a deformation structure according to a first exemplary embodiment of the present invention.

FIG. 1 shows a perspective view of a deformation structure 1 according to the first exemplary embodiment of the present invention in a starting position. The deformation structure 1 is mounted on a front face of a motor vehicle front end, in particular on a motor vehicle front, in front of a bumper crossmember, which is not shown, instead of a known pedestrian protection foam. In particular, the deformation structure 1 is arranged in a space between a vehicle outer skin, that is to say a bumper cladding, and the bumper crossmember.

As is shown in FIG. 1, the deformation structure 1 has exactly three layers 3, 5, 3 arranged one behind the other. The layers 3, 5, 3 are spaced apart from one another and connected to one another at opposite sides of the layers 3, 5, 3 via two deformation control devices 7. The layer 3 that is at the bottom in FIG. 1 has fastening means in the form of clips 39 in order to fasten the deformation structure 1 in a form-fitting and positionally fixed manner to a front side or outer side of the bumper crossmember. For this purpose, corresponding openings for inserting the clips 39 are provided in the bumper crossmember. In principle, the deformation structure 1 may also be fastened to the bumper crossmember via a screw connection, an adhesive bond or another connection.

Figure 2:
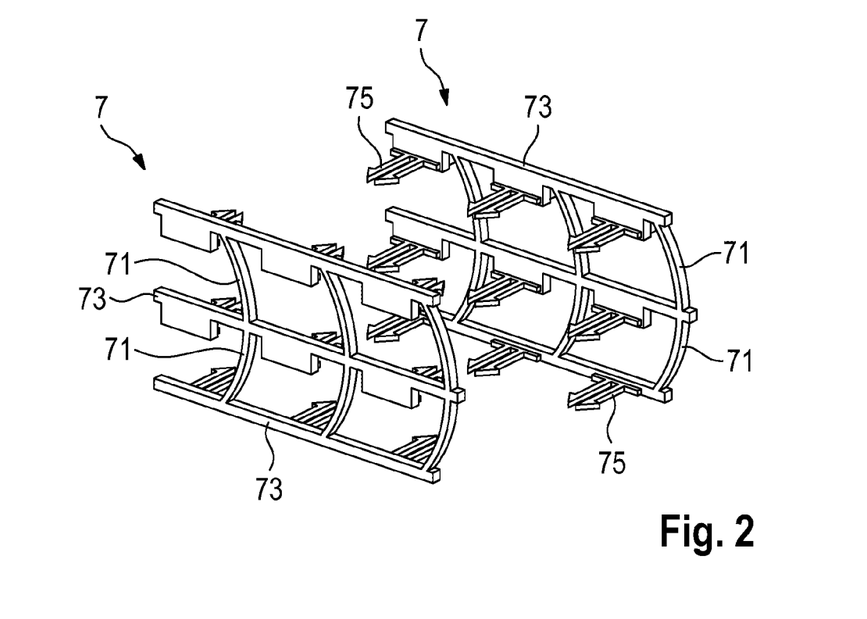
FIG. 2 schematically shows a perspective view of a left-hand and a right-hand deformation control device according to the first exemplary embodiment of the present invention.

The two deformation control devices 7 are illustrated in FIG. 2 in a perspective view without the layers 3, 5, 3. The deformation control device 7 is connected fixedly in a form-fitting manner to each layer 3, 5, 3 at multiple points, i.e. in this exemplary embodiment three points, via clips 75. Each deformation control device 7 has three control webs 71 per layer pair. The control webs 71 have an oblique or arcuate form in such a way that the control webs 71 display a hinge action in a certain direction depending on a collision load or a collision impulse. The control webs 71 run in each case between two oppositely situated fastening webs 73. The control webs 71 between the top layer 3 and the middle layer 5 are formed counter to the control webs 71 between the middle layer 5 and the bottom layer 3, with the result that their hinge actions point in opposite directions. Each fastening web 73 is assigned one of the layers 3, 5, 3. Three clips 75 for engaging with a corresponding opening in the associated layer 3, 5, 3 are arranged on each fastening web 73. The clips 75 have resilient protrusions for engaging behind the opening. Each deformation control device 7 is manufactured in one piece by plastic injection molding. The deformation control device 7 may also have more or fewer control webs 71. This also depends in particular on the dimensions of the layers 3, 5, 3 and/or of the deformation structure 1. More than three layers, preferably an odd number of layers, is also possible. Correspondingly, in this case, the deformation control device has a corresponding number of fastening webs. The hinge action of the control webs runs in this case in opposite directions for each adjacent layer pair.

Figure 3:
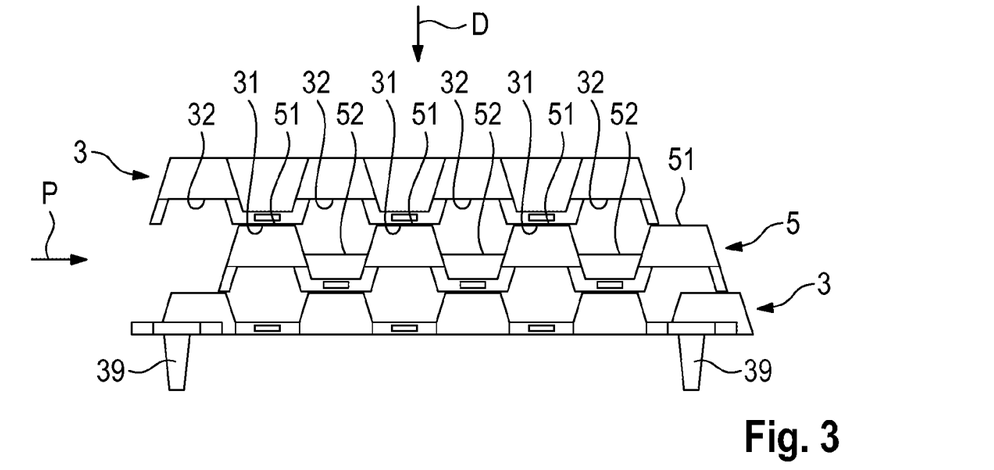
FIG. 3 schematically shows a side view of the deformation structure according to the first exemplary embodiment of the present invention in a collision load case with a low collision impulse.

FIG. 3 shows a side view of the deformation structure 1 without illustrating the deformation control devices 7, a deformation direction D of the deformation structure 1 in FIG. 3 running from top to bottom and being illustrated by an arrow. The deformation direction D is a vehicle longitudinal direction in this case. A transverse direction in the plane of the drawing corresponds to a vehicle transverse direction. The deformation structure 1 has its deformation function in the deformation direction D. FIG. 3 shows an already-deformed state that was caused by a low collision impulse. The layers 3, 5, 3 have an at least similar construction. A first layer 3 from the top consists of alternating protrusions 31 and depressions 32. Similarly, the second layer 5 from the top consists of alternating protrusions 51 and depressions 52. This is adjoined by a further layer 3, which is formed for fastening to the bumper crossmember, which is not shown, and likewise has protrusions and depressions that are assigned to corresponding protrusions and depressions of the middle layer 5.

The layers 3, 5, 3 according to the first exemplary embodiment are produced separately from one another by means of plastic injection molding, as a result of which the layers 3, 5, 3 can be produced cost-effectively and can have a sufficiently lightweight form.

Figure 4:
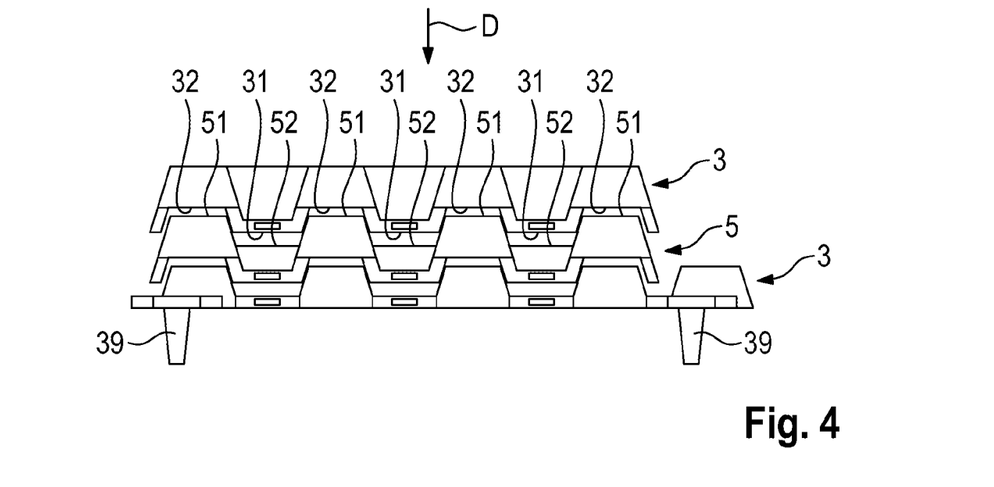
FIG. 4 schematically shows a side view of the deformation structure according to the first exemplary embodiment of the present invention in a collision load case with a high collision impulse.

With reference to FIGS. 3 and 4, a function of the deformation structure 1 is illustrated for different collision load cases. In the event of a frontal collision of the motor vehicle with an object or a person, a load, or at least a resultant of a collision load, acts in the vehicle longitudinal direction, i.e. in the deformation direction D, on the deformation structure 1, the frontmost layer 3 (the top layer in the figures) being displaced in the direction of the middle layer 5 with elastic deformation of the control webs 71. The middle layer 5 is also displaced in the direction of the rear layer 3 (the bottom layer in the figures). In the starting position of the deformation structure 1, which is shown in FIG. 1, the protrusions 31 of the layers 3 and the depressions 52 of the layers 5 and also the depressions 32 of the layers 3 and the depressions 51 of the layers 5 are situated opposite one another. If the layers 3 and the layers 5 were not connected to one another via the control webs 71, it would be possible for adjoining layers 3, 5 to be displaced from this starting position toward one another and into one another substantially unimpeded with only low resistance.

FIG. 3 shows the collision load case with the low collision impulse, which takes place for example at a collision speed of the motor vehicle of under a predefined collision speed of 20 km/h and which is less relevant for pedestrian protection. FIG. 4 shows a collision load case with a high collision impulse, which takes place for example at a collision speed of the motor vehicle of equal to or above the predefined collision speed of 20 km/h. The predefined collision speed is mentioned here merely by way of example and may also have a different value.

First of all, a function of the deformation structure 1 will be described for the collision of the motor vehicle at a collision speed of less than 20 km/h with reference to FIG. 3.

The control webs 71 are arranged and configured such that, in the case of the low collision impulse, the adjacent layers 3, 5 undergo a pivoting movement in relation to one another while being pressed in a direction toward one another. Since the bottom layer 3 is fixed to the bumper crossmember and the top layer 3 is also substantially positionally fixed by the action of force during the collision, only the middle layer 5 can move and be displaced in a parallel manner in the direction P, which is predefined by the control webs 71. The control webs 71 act here for example like what are known as film hinges, which assist the pivoting movement and/or define the pivoting path. With this pivoting movement, in addition to the movement toward one another a parallel displacement of the adjacent layers 3 and 5 in relation to one another takes place. Here, the protrusions 31 of the layers 3 pass into a position opposite to the protrusions 51 of the layers 5, until the upper sides or end faces of the protrusions 31 of the layers 3 come into contact with the upper sides or end faces of the protrusions 51 of the layers 5 (the state shown in FIG. 3). In this respect, the upper sides or the end faces of the protrusions 31 and 51 may be configured in such a way that a further parallel displacement of the layers 3 and 5 in relation to one another is made more difficult. For example, the protrusions 31 and 51 may be provided with a friction-increasing measure, for example a corrugation.

In this way, in the case of the slow collision speed and therefore the low collision impulse, depending on the level of collision load, the deformation structure 1 transmits the collision load in the state of FIG. 3 directly to a structure of the motor vehicle situated behind, i.e. the bumper crossmember, or the individual layers 3, 5, 3 of the deformation structure 1 undergo brittle failure by breaking after the protrusions 31, 51 impinge on one another and/or undergo failure by plastic deformation at a higher level of load than at the quicker collision speed. The deformation structure 1 is preferably designed such that it does not undergo failure and thus a depth to which a collision counterpart penetrates remains low. The penetration depth of the obstacle or the counterpart vehicle is in this case initially smaller as a result of the low deformation of the deformation structure and what are known as crash boxes, via which the bumper crossmember is connected to longitudinal members (engine mounts) of the body, can sufficiently absorb collision energy. Overall, this makes it possible to keep damage to the motor vehicle sufficiently low.

In particular, the deformation structure 1 may be designed in such a way that it can transmit a collision load to the crash structure without failure of the deformation elements 3 at collision speeds of less than 4 km/h, for example. That is to say that the control webs 7 are merely elastically deformed and the structure of the layers 3 and 5 itself does not undergo failure. This is advantageous if, in the event of what are known as parking knocks or the like, the intention is for no damage to the motor vehicle that requires repair to occur, and influences for example an insurance classification of the motor vehicle. The deformation structure 1 elastically moves back into its starting position after the parking knock by virtue of the elastic restoring force of the deformation control devices 7. At collision speeds from 4 km/h up to approximately 20 km/h, the collision energy is high enough that the crash boxes have to absorb collision energy by deforming, the collision load being transmitted to the crash boxes via the bumper crossmember by way of the position of the deformation structure 1 shown in FIG. 3 (as far as possible without further deformation). The damage to the front face of the motor vehicle front end can, however, be kept relatively low overall by virtue of the low penetration depth mentioned.

A function of the deformation structure 1 in the event of the collision of the motor vehicle at the collision speed of equal to or greater than 20 km/h will be described below with reference to FIG. 4.

The control webs 71 are arranged and configured such that, in the case of the high collision impulse, they undergo failure and/or more or less collapse, such that they do not display a hinge action. In this respect, the mass inertia of the layers 3, 5, 3 in the case of the high collision impulse is in particular high enough that the control webs 71 cannot bring about or assist a lateral deflection movement (parallel displacement) of the layers 3, 5, 3 in relation to one another. As a result, the protrusions 31 of the layers 3 and the depressions 52 of the layers 5 and also the protrusions 51 of the layers 5 and the depressions 32 of the layers 3 are moved directly toward one another. In the further course of the collision and deformation of the deformation structure 1, the protrusions 31 of the layers 3 are pushed completely into the depressions 52 of the layers 5. Similarly, the protrusions 51 of the layers 5 are pushed completely into the depressions 32 of the layers 3. Since substantially no deformation of the structure of the layers 3 or the layers 5 is required for this purpose, and only the control webs 71 are deformed, the deformation structure 1 deforms—at least to the state shown in FIG. 4—at a relatively low level of force.

This is advantageous insofar as it is important, from the collision speed of approximately 20 km/h, for the front face of the motor vehicle front end, and in particular the bumper cladding in conjunction with the deformation structure 1, to react in a sufficiently soft manner in the case of a low level of deformation force in order to protect a pedestrian. The front face then acts in a similarly soft manner to when there is an arrangement of known pedestrian protection foam instead of the deformation structure according to the invention. Accordingly, if the collision counterpart is a pedestrian, a relatively low force advantageously acts on the pedestrian at a speed of approximately 20 km/h and more.

Overall, the deformation structure 1 according to the invention consequently makes it possible to resolve a conflict of objectives, which firstly at very low collision speeds that are not relevant for pedestrian protection allows sufficiently great stiffness of the deformation structure 1 and/or a sufficiently great level of deformation force of the deformation structure 1 and/or a sufficiently great transmission of force to the structure situated behind with the bumper crossmember in the crash boxes, and at a somewhat higher collision speed that is relevant for pedestrian protection ensures sufficient pedestrian protection by means of a low level of deformation force.

Figure 5:
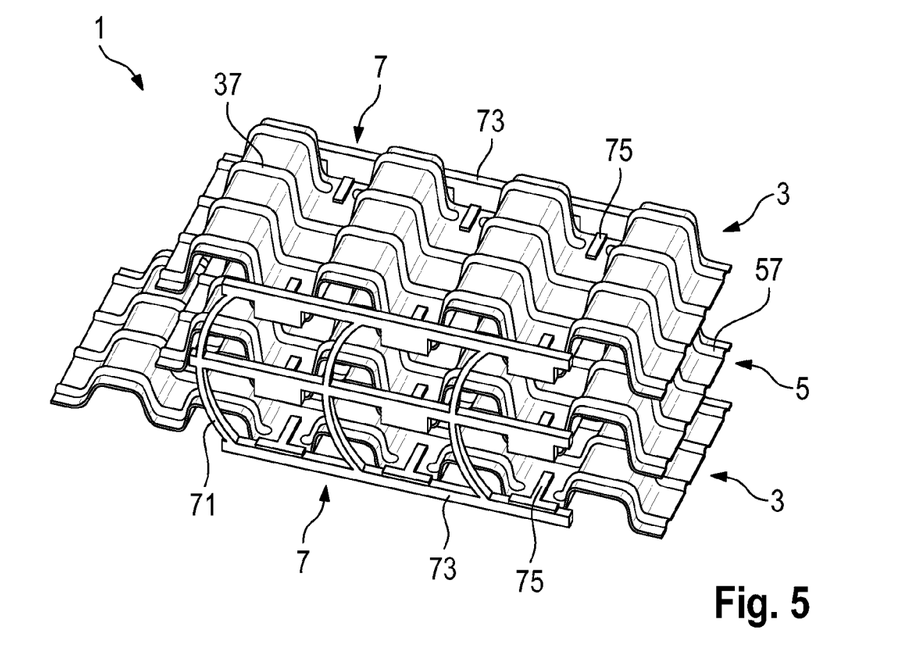
FIG. 5 schematically shows a perspective view of a deformation structure according to a second exemplary embodiment of the present invention.
Figure 6:
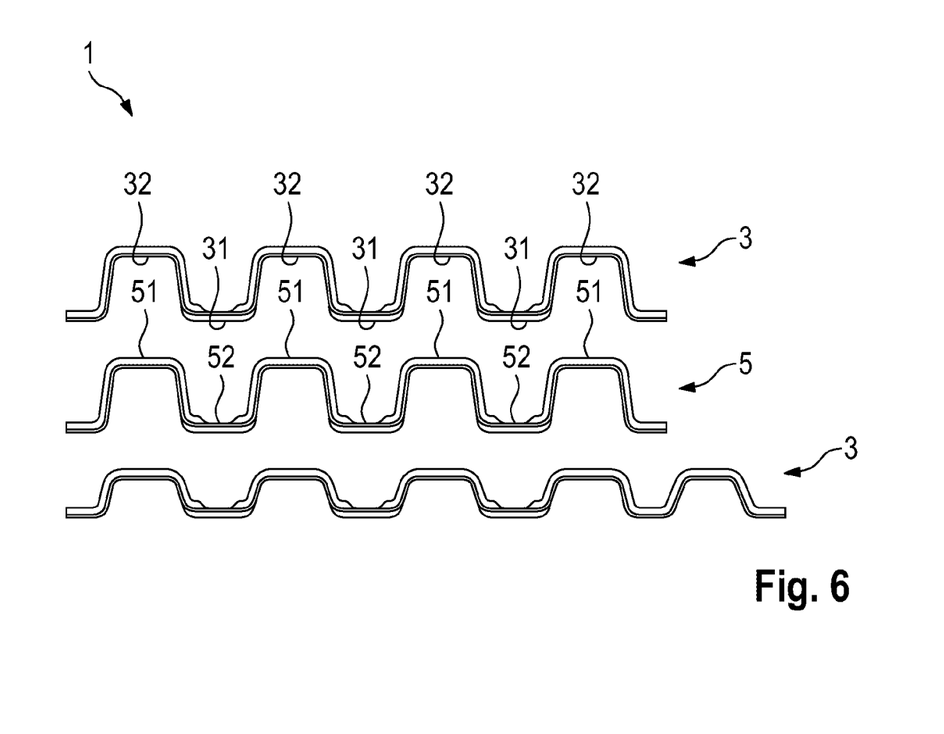
FIG. 6 schematically shows a side view of the deformation structure according to the second exemplary embodiment of the present invention in a starting position.

FIGS. 5, 6, 7 and 8 show a deformation structure 1 according to a second exemplary embodiment. FIG. 5 shows a perspective view of the deformation structure 1 in a starting position with a deformation control device 7. FIG. 6 shows a side view of the deformation structure 1, the deformation control device 7 not being shown, in the starting position. Analogously to the first exemplary embodiment, the deformation structure 1 according to the second exemplary embodiment has layers 3, 5, 3, which are arranged spaced apart from one another and are connected by means of two deformation control devices 7. The top layer 3 has alternating protrusions 31 and depressions 32. The middle layer 5 has alternating protrusions 51 and depressions 52. The protrusions 31 of the layer 3 have a complementary form to the depressions 52 of the layer 5 in such a way that they can enter into the depressions 52. The protrusions 51 of the layer 5 have a similarly complementary form to the depressions 32 of the layer 3 in such a way that they can enter into the depressions 32. The same also applies between the middle layer 5 and the bottom layer 3.

Figure 7:
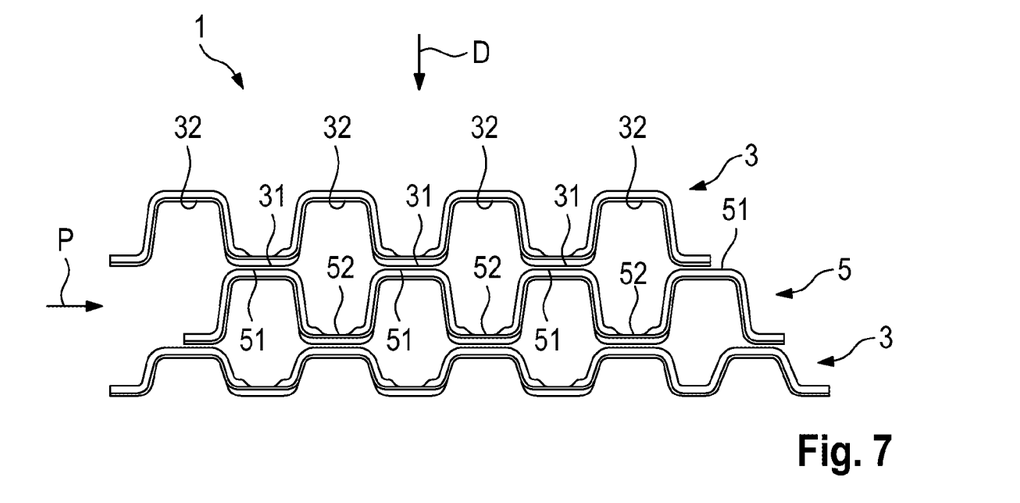
FIG. 7 schematically shows a side view of the deformation structure according to the second exemplary embodiment of the present invention in a collision load case with a low collision impulse.

Analogously to the deformation structure 1 according to the first exemplary embodiment, the deformation structure 1 according to the second exemplary embodiment is formed to receive a collision load and functions in principle as has already been described with reference to the first exemplary embodiment. The collision load in FIGS. 7 and 8 acts from top to bottom and substantially perpendicularly in relation to mid-planes of the layers 3, 5, 3 in a deformation direction D. FIG. 5 and FIG. 6 show the state of the deformation structure 1 prior to a deformation. FIG. 7 shows a deformation of the deformation structure 1 owing to the collision load with a relatively low collision impulse. In the case of the relatively low collision impulse which is shown in FIG. 7, the control webs 71 cause the layers 3 and 5 to pivot in relation to one another, with the result that the protrusions 31 of the layers 3 impinge on the protrusions 51 of the layers 5. As already described above with reference to the first exemplary embodiment, in addition to a movement of the layers 3, 5, 3 toward one another, a parallel displacement P of the layers 3, 5, 3 in relation to one another accordingly takes place. In particular, in this respect the middle layer 5 is displaced, since the bottom (rearmost) layer 3 is fastened in a positionally fixed manner to the bumper crossmember and the top (frontmost) layer 3 is substantially positionally fixed by the introduction of load from the collision counterpart.

Figure 8:
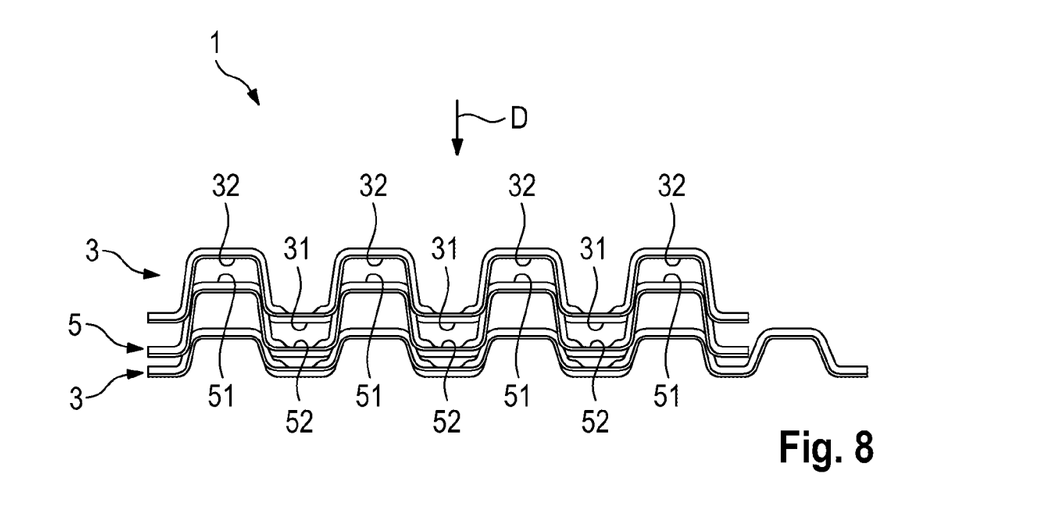
FIG. 8 schematically shows a side view of the deformation structure according to the second exemplary embodiment of the present invention in a collision load case with a high collision impulse.

FIG. 8 shows a deformation of the deformation structure 1 owing to a collision load with a relatively great collision impulse. In this respect, analogously to the first exemplary embodiment, oppositely situated protrusions 31, 51 and depressions 52, 32 enter into one another in the case of a low deformation force of the deformation structure 1. The deformation structure 1 is accordingly deformed over a certain deformation distance at a low level of force—in other words, the deformation structure exhibits softer behavior from a certain threshold value (e.g. in the event of a collision of the motor vehicle from 20 km/h).

By contrast with the deformation structure 1 according to the first exemplary embodiment, the layers 3, 5, 3 of the deformation structure 1 according to the second exemplary embodiment are produced from a deep-drawn steel sheet. It is also possible to produce the layers 3, 5, 3 by roll forming or another shaping process. The layers 3, 5, 3 have a shape similar to what is known as a wavy metal sheet or a trapezoidal metal sheet. As can be readily seen in particular in FIG. 5, each layer has a plurality of embossings (beads) 37 and 57 in the transverse direction of the trapezoidal structure, which advantageously increases a resistance of the layers 3, 5, 3 to buckling. The embossings 37, 57 of the layers 3, 5, 3 may also engage in one another when the layers 3, 5, 3 impinge on one another, with the result that a movement of the layers 3, 5, 3 in relation to one another is inhibited. This is advantageous in particular when a collision load acts obliquely on the deformation structure 1. The engagement of the embossings 37 and 57 into one another allows a torque to be transferred and promotes the mutually parallel realignment of the layers 3, 5, 3 to the benefit of a desired function of the deformation structure 1.

The deformation control device 7 according to the second exemplary embodiment has clips 75, which engage around an edge of the associated layer 3, 5, 3 from either side and thus connect the deformation control device 7 to the layers 3, 5, 3 (by contrast to the first exemplary embodiment, in which the clips 75 engage into a lateral opening in the layers 3, 5, 3). Apart from this, the deformation control device 7 of the second exemplary embodiment has the same construction as the deformation control device 7 of the first exemplary embodiment.

Figure 9:
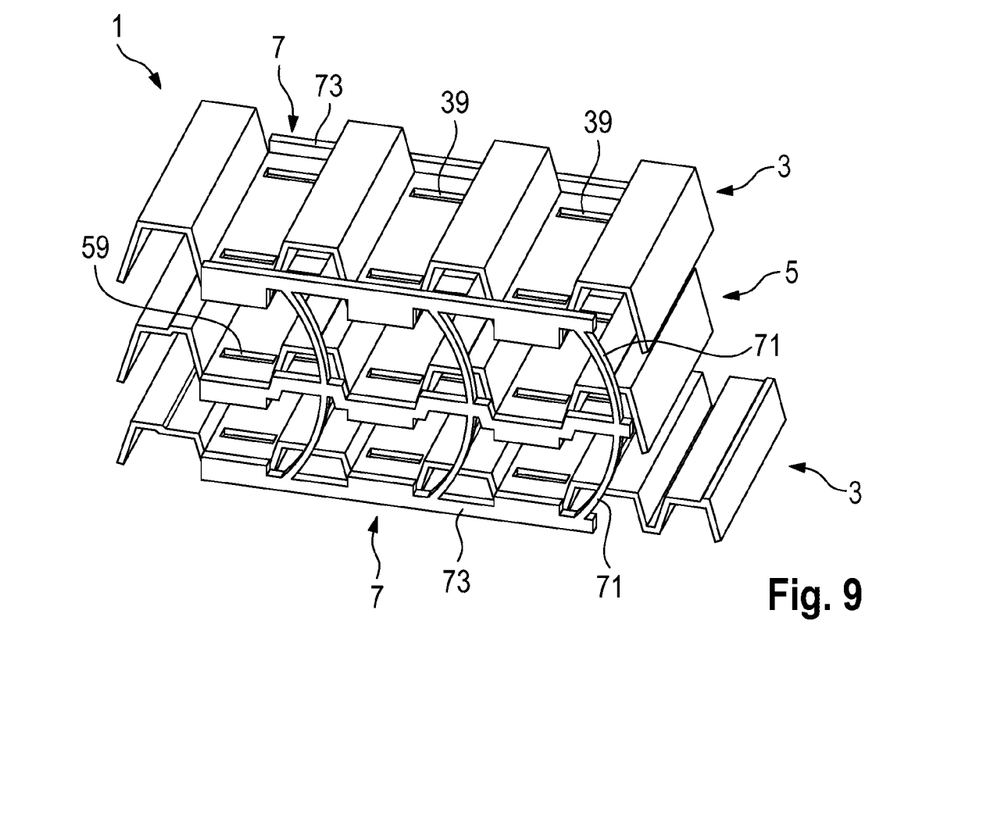
FIG. 9 schematically shows a perspective view of a deformation structure according to a third exemplary embodiment of the present invention.
Figure 10:
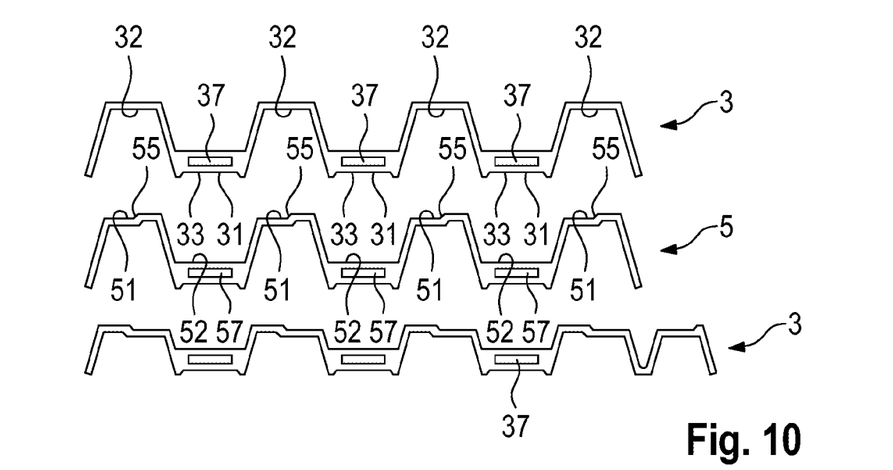
FIG. 10 schematically shows a side view of the deformation structure according to the third exemplary embodiment of the present invention in a starting position.

FIGS. 9, 10, 11 and 12 show a deformation structure 1 according to a third exemplary embodiment. FIG. 9 shows a perspective view of the deformation structure 1 in a starting position with a deformation control device 7. FIG. 10 shows a side view of the deformation structure 1 in the starting position, the deformation control device 7 not being shown. Analogously to the first exemplary embodiment and the second exemplary embodiment, the deformation structure 1 according to the third exemplary embodiment has layers 3, 5, 3 that are arranged spaced apart from one another and are connected by means of two deformation control devices 7. The top layer 3 has alternating protrusions 31 and depressions 32. The middle layer 5 has alternating protrusions 51 and depressions 52. The protrusions 31 of the layer 3 have a complementary form to the depressions 52 of the layer 5 in such a way that they can enter into the depressions 52. The protrusions 51 of the layer 5 likewise have a complementary form to the depressions 32 of the layer 3 in such a way that they can enter into the depressions 32. The same applies for the layer pair of the middle layer 5 and the bottom layer 3.

Figure 11:
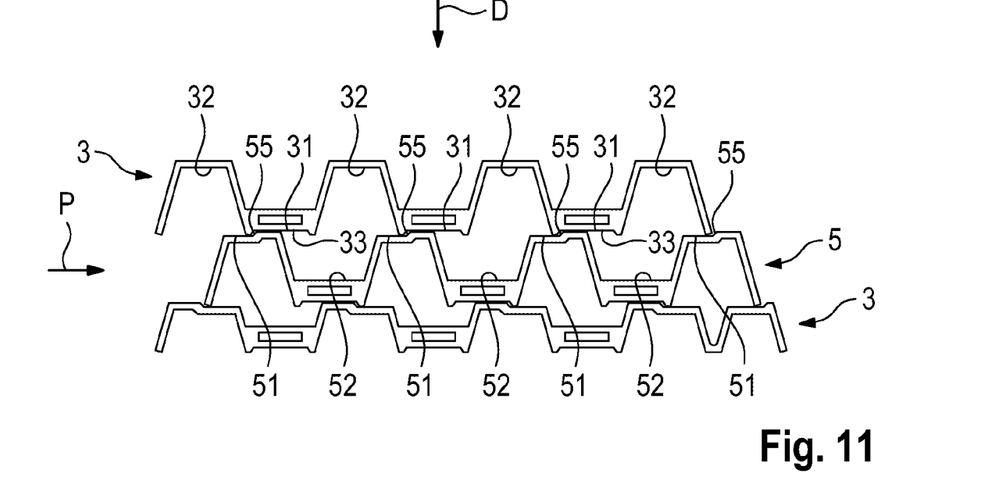
FIG. 11 schematically shows a side view of the deformation structure according to the third exemplary embodiment of the present invention in a collision load case with a low collision impulse.
Figure 12:
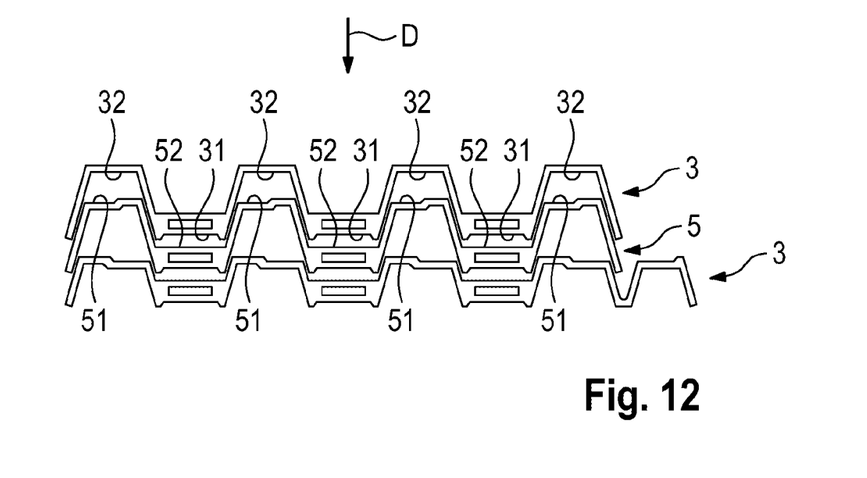
FIG. 12 schematically shows a side view of the deformation structure according to the third exemplary embodiment of the present invention in a collision load case with a high collision impulse.

Analogously to the deformation structure 1 according to the first exemplary embodiment and the second exemplary embodiment, the deformation structure 1 according to the third exemplary embodiment is formed to receive a collision load and functions in principle as already described with reference to the first exemplary embodiment. As shown in FIGS. 11 and 12, the collision load acts substantially perpendicularly to mid-planes of the layers 3, 5, 3 in a deformation direction D, which corresponds to the vehicle longitudinal direction. FIG. 11 shows a deformation of the deformation structure 1 owing to the collision load with a relatively low collision impulse. In the case of the relatively low collision impulse, the control webs 71 cause the layers 3 and 5 to pivot in relation to one another, with the result that the protrusions 31 of the layer 3 impinge on the protrusions 51 of the layer 5. As already described above with reference to the first exemplary embodiment, in addition to a movement of the layers 3, 5, 3 toward one another a parallel displacement P of the layers 3, 5, 3 in relation to one another accordingly takes place.

FIG. 12 illustrates a deformation of the deformation structure 1 owing to a collision load with a relatively great collision impulse. In this case, analogously to the first exemplary embodiment and the second exemplary embodiment, oppositely situated protrusions 31, 51 and depressions 52, 32 enter into one another at a low deformation force of the deformation structure 1. The deformation structure 1 is accordingly deformed over a certain deformation distance at a low level of force—in other words, the deformation structure exhibits softer behavior from a certain threshold value (e.g. in the event of a collision of the motor vehicle from 20 km/h).

By contrast with the deformation structure 1 according to the first exemplary embodiment and the second exemplary embodiment, the layers 3, 5, 3 of the deformation structure 1 according to the third exemplary embodiment are produced from an extruded aluminum profile. This makes it possible to produce the layers cost-effectively and to cut them to the required length. It is also conceivable to produce the layers 3, 5, 3 from aluminum by a different production process. The layers 3, 5, 3 have a trapezoidal shape.

The deformation control device 7 according to the third exemplary embodiment has clips, which are provided for engagement with associated lateral openings 37, 57 (see FIGS. 10, 11, 12) in the layers 3, 5, 3. In addition, provided in the layers 3, 5, 3 are openings 39, 59 with which spring arms of the clips can engage in a form-fitting manner when the clips are inserted into the openings 37, 57. Openings 39, 59 may be formed by stamping.

In the third exemplary embodiment, the protrusions 51 of the layers 5 also have steps 55. The protrusions 31 of the layers 3 have complementary depressions 33 or steps 33 to the steps 55. In the event of the collision with the relatively low collision impulse, oppositely situated steps 55 and depressions 33 impinge on one another and form a form-fitting engagement in a lateral direction or transverse direction, as shown in FIG. 11. As a result, the layers 3, 5, 3 remain more stably in the position and an introduction of force onto the bumper crossmember is reliably produced.

What is claimed is:
1. A deformation structure, comprising:
at least one first layer and a second layer, which are arranged spaced apart from one another and so as to be displaceable with respect to one another in a deformation direction, wherein
the at least one first layer and the second layer have complementary protrusions and depressions, which are formed such that the protrusions of the at least one first layer and the depressions of the second layer and also the protrusions of the second layer and the depressions of the at least one first layer can enter into one another;
a deformation control device by which the at least one first layer and the second layer are connected to one another in such a way that, in case of a high impulse in the deformation direction, the protrusions of the at least one first layer enter into the depressions of the second layer and also the protrusions of the second layer enter into the depressions of the at least one first layer, whereby a deformation of the deformation structure in the deformation direction takes place at a low level of force, and in such a way that, in case of a low impulse in the deformation direction, the protrusions of the at least one first layer impinge on the protrusions of the second layer, whereby deformation of the deformation structure in the deformation direction takes place at a high level of force, wherein the deformation control device is connected detachably or non-detachably to the at least one first layer and to the second layer, and and at least one protrusion of the second layer or at least one protrusion of the at least one first layer has a depression, which is adapted in such a way that the at least one protrusion of the at least one first layer or the at least one protrusion of the second layer can engage into the depression, such that a movement of the at least one first layer and the second layer in relation to one another is inhibited at least in the lateral direction.

2. The deformation structure according to claim 1, wherein at least one of:
the deformation control device is connected to the at least one first layer and/or the second layer via a clip connection,
the deformation control device is adhesively bonded to the at least one first layer and/or the second layer, or
the deformation control device is pressed together with the at least one first layer and/or the second layer.

3. The deformation structure according to claim 1, wherein
the deformation control device is an injection-molded part.

4. The deformation structure according to claim 1, wherein
the deformation control device has a plurality of elastically deformable control webs, the plurality of elastically deformable control webs connect the at least one first layer and the second layer to one another.

5. The deformation structure according to claim 4, wherein
at least two deformation control devices are provided, and
the at least two deformation control devices are arranged at opposite ends of the at least one first layer and the second layer and are connected to the at least one first layer and the second layer.

6. The deformation structure according to claim 1, wherein
the at least one first layer and the second layer are each formed in one piece as an injection-molded part.

7. The deformation structure according to claim 1, wherein
the at last one first layer and the second layer are each formed in one piece as a deep-drawn component.

8. The deformation structure according to claim 1, wherein
the at least one first layer and the second layer are each formed in one piece as an extruded profile.

9. The deformation structure according to claim 1, wherein
the protrusions of the at least one first layer and/or of the second layer have a surface that has been modified by a friction-increasing measure.

10. The deformation structure according to claim 9, wherein
the protrusions of the at least one first layer and/or of the second layer have increased roughness and are corrugated.

11. The deformation structure according to claim 1, wherein the at least one protrusion of the at least one first layer and the at least one protrusion of the second layer have a complementary form to one another in such a way that a form fit between the at least one protrusion of the at least one first layer and the at least one protrusion of the second layer is produced at least in a lateral direction in the case of the low impulse in the deformation direction.

12. The deformation structure according to claim 11, wherein
the at least one protrusion of the second layer and/or the at least one protrusion of the at least one first layer have/has a step, which is adapted in such a way that the at least one protrusion of the at least one first layer and/or the at least one protrusion of the second layer can engage with the step, such that a movement of the at least one first layer and the second layer in relation to one another is inhibited at least in the lateral direction.

13. The deformation structure according to claim 1, wherein
the at least one first layer and the second layer are displaceable in a direction parallel to one another by deformation of the deformation control device.

14. The deformation structure according to claim 1, wherein
the deformation control device undergoes brittle and/or plastic failure in the case of the high impulse, and
the deformation control device is reversibly elastically deformable in the case of the low impulse.

15. The deformation structure according to claim 1, wherein
the protrusions of the at least one first layer and the depressions of the second layer and also the depressions of the at least one first layer and the protrusions of the second layer are arranged opposite one another in a starting position of the deformation structure.

16. The deformation structure according to claim 1, wherein
the deformation structure has an odd number of layers, wherein two adjacent layers in each case form a first layer and a second layer.

17. The deformation structure according to claim 16, wherein
the deformation structure has exactly three layers, corresponding to a first layer, a second layer and a further layer that substantially corresponds to the first layer.

18. The deformation structure according to claim 16, wherein
the deformation control device is configured in such a way that adjacent layers are displaceable in opposite directions in the case of the low collision impulse.

19. A pedestrian protection device for a motor vehicle, comprising:
the deformation structure according to claim 1, wherein
the deformation structure is arranged between different components of a bumper.

20. The deformation structure according to claim 1, wherein the deformation control device is formed separately from and is connected only detachably to the at least one first layer and the second layer.

21. A deformation structure, comprising:
at least one first layer and a second layer, which are arranged spaced apart from one another and so as to be displaceable with respect to one another in a deformation direction, wherein
the at least one first layer and the second layer have complementary protrusions and depressions, which are formed such that the protrusions of the at least one first layer and the depressions of the second layer and also the protrusions of the second layer and the depressions of the at least one first layer can enter into one another;

a deformation control device by which the at least one first layer and the second layer are connected to one another in such a way that, in case of a high impulse in the deformation direction, the protrusions of the at least one first layer enter into the depressions of the second layer and also the protrusions of the second layer enter into the depressions of the at least one first layer, whereby a deformation of the deformation structure in the deformation direction takes place at a low level of force, and in such a way that, in case of a low impulse in the deformation direction, the protrusions of the at least one first layer impinge on the protrusions of the second layer, whereby deformation of the deformation structure in the deformation direction takes place at a high level of force, wherein the deformation control is connected detachably or non-detachably to the at least one first layer and to the second layer, and at least one protrusion of the second layer and/or at least one protrusion of the at least one first layer have/has a step, which is adapted in such a way that the at least one protrusion of the at least one first layer and/or the at least one protrusion of the second layer can engage with the step, such that a movement of the at least one first layer and the second layer in relation to one another is inhibited at least in the lateral direction.

* * * * *